March 27, 1956  C. H. PETERS  2,739,625
SAW TABLE RIP FENCE WITH PUSHER ELEMENT
Filed Aug. 14, 1953
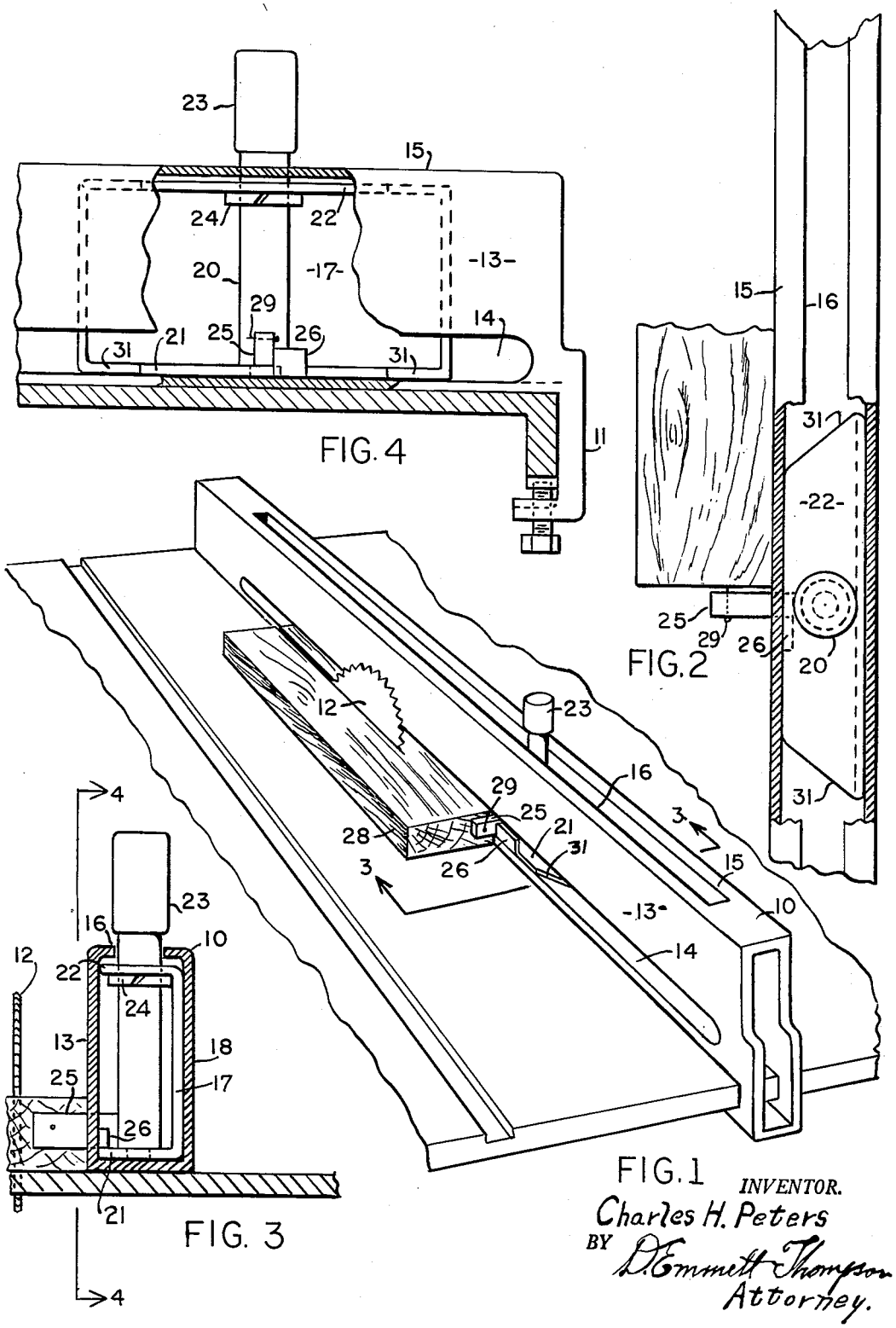
INVENTOR.
Charles H. Peters
BY D. Emmett Thompson
Attorney.

United States Patent Office 2,739,625
Patented Mar. 27, 1956

2,739,625

SAW TABLE RIP FENCE WITH PUSHER ELEMENT

Charles H. Peters, Syracuse, N. Y.

Application August 14, 1953, Serial No. 374,333

5 Claims. (Cl. 143—51)

This invention relates to rip fences or guides for table saws. It has been recognized for many years that power operated rip saws constitute one of the most dangerous types of wood working tools. Many of the accidents on these tools result from pushing the work piece or stock past the circular saw blade at the end portion of the cut. To reduce this hazard, push sticks are used to push the stock past the blade whereby the hand of the operator is spaced further from the blade. It has also been proposed to employ a push member slidably mounted on the rip fence. While these devices, when used, lessen the hazard, they have the disadvantage of not being readily available and often they become lost or misplaced and the operator will not take the time to locate them. This is particularly true in schools and hobby shops.

This invention has as an object a rip fence embodying in its structural arrangement a work or stock feeding mechanism, this mechanism forming a part of the fence itself and accordingly is always ready for use and can not become lost or misplaced.

The invention has as a further object a rip fence of the type referred to embodying a structure which is particularly economical to manufacture and which functions to properly guide and advance the work past the saw, and, at the same time permits the use of tennoning fixtures and other devices on the rip fence.

The invention consists in the novel features and in the combinations and constructions hereinafter set forth and claimed.

In describing this invention, reference is had to the accompanying drawings in which like characters designate corresponding parts in all the views.

Figure 1 is a perspective view of a rip fence embodying my invention, the fence being mounted upon a saw table.

Figure 2 is a fragmentary top plan view of the rip fence with a portion of the top wall broken away.

Figure 3 is a view taken on line 3—3, Figure 1.

Figure 4 is a side elevational view looking to the right, Figure 1, with a portion of the side wall removed, as indicated by line 4—4, Figure 3.

The rip fence consists of a bar 10 adapted to be mounted on a saw table and provided at one or both ends with conventional clamp mechanism 11 for rigidly securing the fence to the saw table with the desired spacing between the saw blade 12 and the confronting wall 13 of the tubular member. The bar 10 is shown in the drawings as a tubular member rectangular in cross section. The confronting wall 13 is formed, adjacent its lower edge, with a lengthwise extending slot 14, and one of the remaining walls, preferably the top wall 15, is formed with a lengthwise extending slot 16. A slide is mounted for movement lengthwise of the bar 10. This slide may be economically manufactured in channel formation, and positioned with its bottom wall 17 contiguous to the rear wall 18 of the member 10, and its open side facing the wall 13. A stem 20 is journalled at its lower end in the lower side wall 21 of the slide member and extends upwardly through the top side wall 22 thereof, and through the slot 16, and is provided with a suitable knob 23 to effect, by manual manipulation, movement of the slide lengthwise of the bar 10. Means is provided for preventing upward movement of the stem 20, such as a snap ring 24. A stock engaging member 25 is fixedly secured at its inner end to the lower end portion of the stem 20 in registration with the slot 14. The arrangement is such that upon rotation of the stem 20, the stock engaging member 25 is moved into and out of the slot bar 10, the outer end portion of the member 25 moving through the slot 14.

A stop is provided on the slide for positioning the stock engaging member 25 perpendicular to the wall 13 of the bar. This stop may be economically provided by bending a tab portion 26 upwardly from the bottom wall 21 of the slide member. With this arrangement, when the end of the board or work piece 28 has been advanced past the rear end of the slot 14, the knob 24 is rotated in a counter-clockwise direction Figure 2, to move the work engaging member 25 outwardly through the slot 14 against the stop member 26. The slide is then advanced forwardly by the knob, the work engaging member 25 advancing the work piece 28 past the saw. Preferably, the member 25 is provided with a pointed pin 29 for engaging the rear end of the work piece. The slot 14 extends rearwardly a greater distance than the slot 16 in the top wall 15. This is to provide for the ready escape of any accumulation of sawdust within the bar 10, through the slot 14, to permit the slide to be withdrawn to its rearmost position. Also, the forward and rear edges of the bottom wall 21 of the slide member may be formed at an angle as indicated at 31, Figures 2 and 3, to direct sawdust from within the bar outwardly through the slot 14 during movement of the slide. The slot 16 extends in proximity to the rear end of the fence, whereby substantially the entire length of the fence is free and clear from all projections to permit fixtures of various types to be slidably mounted upon the fence. It will be observed that the knob 24 positions the hand of the operator remote from the saw blade 12, and the fence serving as a guide for the hand whereby the operator is not likely to subconsciously move his hand in proximity to the saw blade.

The slot 16 needs only to extend a short distance beyond the vertical plane intersecting the axis of the arbor on which the saw is mounted as movement of the slide to that position will advance the work past the cutting operation of the saw. This provides unobstructed use of the remainder of the fence for the attachment of hold-down devices and guard devices, if desired.

The stock engaging member 25, when moved into operative position, need only project a short distance from the confronting side wall of the fence and need be only of narrow dimension vertically, whereby the operation of the stock feeding mechanism does not interfere with hold-down devices when they are employed.

The rip fence structure described can be formed as a separate unit and readily attached to rip fences now in use, and the fence can be advantageously employed on other power tools, such as band saws, jointers, etc.

What I claim is:

1. A rip fence for saw tables comprising a tubular bar rectangular in cross section and being formed with a slot extending lengthwise of the side wall of the bar confronting the saw blade, a slide mounted in the bar for movement lengthwise thereof, said slide comprising a channel-shaped member with the open side of said member contiguous to said side wall, the top wall of said bar being also formed with a lengthwise extending slot, a stem journalled in said slide and projecting upwardly through the slot in said top wall, a stock engaging member secured to said stem and being movable upon rotation of said stem from a position within said bar outwardly through the slot in said side wall to a position perpendicular to the bar.

2. A rip fence for saw tables comprising a tubular bar rectangular in cross section and being adapted to be mounted on the saw table, said bar being formed with a lengthwise extending slot in the side wall confronting the saw blade and a lengthwise extending slot in the top wall, a slide mounted in the bar for reciprocation lengthwise thereof, said slide consisting of a channel-shaped member with the open side of said member contiguous to the slotted side wall, a vertically arranged stem journalled in the bottom and top walls of said slide member and extending outwardly through the slot in the top wall of the bar, a work engaging member fixed to said stem and being movable into and out of said slot upon rotation of said stem, and stop means carried by the slide member and operable to limit movement of said work engaging member outwardly through the slot in said side wall of the bar.

3. A rip fence as defined in claim 2, wherein the end portions of the bottom wall of said channel member converge toward the slot in the side wall of the bar.

4. A rip fence for saw tables comprising a tubular bar adapted to be mounted on the saw table and being formed with a first slot extending lengthwise in the side wall of the bar confronting the saw blade, said bar being also formed with a second lengthwise extending slot in the top wall thereof, a slide mounted in the bar for movement lengthwise thereof, a stem journalled for free rotation in said slide and extending outwardly through said second slot, a stock engaging member connected to said stem and being movable, upon rotation of said stem, outwardly through said first slot perpendicular to said bar for engaging a work piece positioned on the saw table.

5. A rip fence for saw tables comprising a tubular bar adapted to be mounted on the saw table and being formed with a first slot extending lengthwise in the side wall of the bar confronting the saw blade, said bar being also formed with a second lengthwise extending slot in the top wall thereof, a slide mounted in the bar for movement lengthwise thereof, a stock engaging member mounted on said slide for movement through said first slot into and out of said bar, a stem journalled in said slide and extending outwardly through said second slot, said stem being connected to said stock engaging member and being operable upon rotation to effect movement of said stock engaging member through said first slot.

References Cited in the file of this patent
FOREIGN PATENTS

| | | |
|---|---|---|
| 181,952 | Great Britain | June 29, 1922 |
| 219,220 | Switzerland | May 16, 1942 |